US012769022B2

(12) United States Patent
Vasconcelos De Almeida et al.

(10) Patent No.: US 12,769,022 B2
(45) Date of Patent: Oct. 20, 2026

(54) METHOD FOR DETECTING A PARASITIC METAL OBJECT ON A CHARGING SURFACE, AND ASSOCIATED CHARGING DEVICE

(71) Applicant: Continental Automotive GmbH, Hannover (DE)

(72) Inventors: Joao Carlos Vasconcelos De Almeida, Toulouse (FR); Brahim Aloui, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 697 days.

(21) Appl. No.: 17/523,114

(22) Filed: Nov. 10, 2021

(65) Prior Publication Data

US 2022/0179119 A1 Jun. 9, 2022

(30) Foreign Application Priority Data

Dec. 3, 2020 (FR) ...................................... 2012654

(51) Int. Cl.
*H02J 50/60* (2016.01)
*G01V 3/12* (2006.01)
*H02J 50/12* (2016.01)

(52) U.S. Cl.
CPC ................ *G01V 3/12* (2013.01); *H02J 50/12* (2016.02); *H02J 50/60* (2016.02)

(58) Field of Classification Search
CPC ............. G01V 3/12; H02J 50/12; H02J 50/60
See application file for complete search history.

(56) References Cited

U.S. PATENT DOCUMENTS 9,985,442 B2 5/2018 Von Novak, III et al.
10,461,813 B2 10/2019 Louis
(Continued)

FOREIGN PATENT DOCUMENTS

CN 107529346 A 12/2017
CN 108141048 A 6/2018
(Continued)

OTHER PUBLICATIONS

Machine translation of WO-2015064103-A1. (Year: 2015).*
(Continued)

*Primary Examiner* — Drew A Dunn
*Assistant Examiner* — Pamela J Jeppson
(74) *Attorney, Agent, or Firm* — Buchanan Ingersoll & Rooney.P.C.

(57) ABSTRACT

A method for detecting a foreign metal object, by way of a charging device, including a microcontroller and a transmitting circuit, having at least one transmitting antenna, which are suitable for charging a portable item of user equipment placed on a charging surface at an operating frequency, the method including a) transmitting a predetermined number of voltage pulses at the terminals of the transmitting antenna, at a parasitic resonant frequency, the parasitic resonant frequency being different and distinct from the operating frequency; b) determining an oscillating frequency of the transmitting circuit; c) if the oscillating frequency is higher than the parasitic resonant frequency, then a foreign metal object is detected on the charging surface.

11 Claims, 5 Drawing Sheets

(56) References Cited

U.S. PATENT DOCUMENTS

| | | | | |
|---|---|---|---|---|
| 2013/0069586 | A1* | 3/2013 | Jung | H02J 50/12 320/108 |
| 2013/0127259 | A1 | 5/2013 | Lohr et al. | |
| 2013/0293192 | A1* | 11/2013 | Abe | H02J 50/12 320/108 |
| 2014/0159503 | A1* | 6/2014 | Murakami | H02J 50/90 307/104 |
| 2015/0285926 | A1* | 10/2015 | Oettinger | H02J 50/70 307/104 |
| 2015/0380978 | A1 | 12/2015 | Toivola et al. | |
| 2017/0005524 | A1 | 1/2017 | Akuzawa et al. | |
| 2017/0013419 | A1 | 1/2017 | Bouthinon et al. | |
| 2017/0093222 | A1* | 3/2017 | Joye | H04B 5/263 |
| 2017/0141604 | A1* | 5/2017 | Park | B60L 53/126 |
| 2017/0317536 | A1* | 11/2017 | Marson | H02J 50/10 |
| 2018/0072166 | A1* | 3/2018 | Percebon | B60L 53/124 |
| 2018/0109152 | A1* | 4/2018 | Chen | H02J 50/60 |
| 2018/0219430 | A1 | 8/2018 | Russell et al. | |
| 2019/0319494 | A1* | 10/2019 | Park | H02J 50/60 |
| 2020/0076245 | A1* | 3/2020 | Jin | H02J 7/02 |
| 2020/0161906 | A1* | 5/2020 | Choi | H02J 7/00036 |

FOREIGN PATENT DOCUMENTS

| | | | | |
|---|---|---|---|---|
| CN | 109496380 | A | 3/2019 | |
| CN | 110268598 | A | 9/2019 | |
| CN | 110875638 | A | 3/2020 | |
| EP | 3065262 | A1 | 9/2016 | |
| FR | 3037197 | A1 | 12/2016 | |
| FR | 3038799 | A1 | 1/2017 | |
| FR | 3043275 | A1 | 5/2017 | |
| KR | 10-2020-0032943 | A | 3/2020 | |
| WO | WO-2015064103 | A1 * | 5/2015 | H02J 17/00 |
| WO | 2017/019297 | A1 | 2/2017 | |

OTHER PUBLICATIONS

French Search Report and Written Opinion for French Application No. 2012654, dated Aug. 5, 2021, with translation, 11 pages.

Ma et al., "Analysis of Metal Foreign Object Setting on Electric Vehicle Wireless Power Transfer System", Advanced Technology of Electrical Engineering and Energy, (Feb. 23, 2017), vol. 36, No. 2, pp. 14-20. (with English translation 14 pages).

Ren et al., "Electromagnetic Characteristics of Metal Foreign Object Detection Coil in Wireless Charging System of Electric Vehicle", Journal of Harbin Institute of Technology, (Jul. 2020), vol. 52, No. 7, pp. 35-42. (with English translation 21 pages).

Office Action (The First Office Action) issued Mar. 29, 2024, by the National Intellectual Property Administration, P. R. China in corresponding Chinese Patent Application No. 202111461789.7 and an English translation of the Office Action. (26 pages).

Notice of Allowance (Notification to Grant Patent Right for Invention) issued Nov. 27, 2024, by the Notional Intellectual Property Administration, P. R. China in corresponding Chinese Patent Application No. 202111461789.7 and an English translation of the Notice of Allowance. (6 pages).

* cited by examiner

METHOD FOR DETECTING A PARASITIC METAL OBJECT ON A CHARGING SURFACE, AND ASSOCIATED CHARGING DEVICE

CROSS REFERENCE TO RELATED APPLICATIONS

This application claims priority to French Patent Application No. 2012654, filed Dec. 3, 2020, the contents of such application being incorporated by reference herein.

FIELD OF THE INVENTION

The field of the invention is the field of magnetically inductive charging devices. In particular, the invention relates to a method for detecting a parasitic metal object on a charging surface of a magnetically inductive electrical charging device and to an associated charging device.

BACKGROUND OF THE INVENTION

Magnetically inductive electrical charging technology is implemented in a system comprising a wireless electrical charging device and an electrical storage battery to be charged in a mobile terminal such as, for example, a portable item of user equipment, such as a mobile telephone. The electrical charging device comprises a transmission antenna, or transmitting antenna. The electrical storage battery comprises a receiving antenna to be charged. When the transmission antenna and the receiving antenna are located opposite each other, variations in the magnetic field that is generated by the transmission antenna cause an electric current to flow in the receiving antenna, thereby charging the electrical storage battery.

Inductive charging technology meets the requirements of a standard, in this case it is the Qi® standard of the Wireless Power Consortium, also called the WPC standard.

In order to detect the presence of a foreign metal object on a charging surface or to detect the presence of an electrical storage battery comprising a receiving antenna located opposite the transmission antenna of the electrical charging device, three steps are currently implemented.

In a first step, the methods of the prior art seek to detect the presence of an object located opposite the electrical charging device. For this purpose, electrical pulses, also called "pings", are sent at the charging frequency via the transmission antenna of the electrical charging device to the receiving antenna. A ping is a continuous signal, exhibiting periodic oscillations, with a period of, for example, 300 ms, and with an oscillation time of 5 to 20 ms. The voltage or the impedance at the terminals of the transmission antenna is observed. If a variation in the voltage at the terminals of the transmission antenna or in the impedance of the transmission antenna is detected, then there is an object opposite the transmission antenna.

The detected object may be either a parasitic metal object or a mobile apparatus such as a mobile telephone equipped with a receiving antenna for inductive electrical charging. In a second step, efforts are then made to establish digital communication with the detected object in order to identify its character. More particularly, efforts are made in this second step to ascertain whether the detected object comprises a receiving antenna for inductive electrical charging in order to charge the latter and that this object is not a parasitic metal object. This communication is performed by modulating the voltage amplitude of the transmitting antenna.

When digital communication is established between the transmission antenna and the receiving antenna of the detected object, then a third step begins. The third step allows the receiving antenna of the detected object to be electrically charged.

If communication cannot be established, then a foreign metal object is involved and charging is not initiated.

The drawback of such a detection method is the high power consumption caused during the transmission of pings and also the quantity of harmful radiation close to a human body. This radiation may in certain cases exceed international recommendations on continuous exposure to magnetic fields when the human body is close (within a few centimeters) to a transmitting antenna.

Another method known from the prior art is to use the one or more NFC (near-field communication) antennas located in the inductive charger in order to detect the presence of the electrical storage battery. The method consists in transmitting signals at a fixed frequency at the frequency of 13.56 MHz; if an electrical storage battery is located close to the NFC antennas, then the impedance and/or the consumption of said NFC antennas varies.

However, this method consumes a lot of electrical energy and necessitates the presence of NFC antennas in the inductive charger, this not always being possible.

The aim of an aspect of the present invention is to overcome all or some of the drawbacks of the prior art, in particular those outlined above, by providing a method for detecting a foreign metal object on the charging surface of an inductive recharging device that also allows detection of any type of portable equipment, whatever the size of the receiving antenna, and also the power receivers used in the certification tests for the Qi standard.

SUMMARY OF THE INVENTION

An aspect of the invention provides a method for detecting a foreign metal object, by way of a charging device, comprising a microcontroller and a transmitting circuit, said transmitting circuit comprising at least one transmitting antenna, which are suitable for charging a portable item of user equipment placed on a charging surface at an operating frequency, the method being noteworthy in that it comprises the following steps:

a. transmitting a predetermined number of voltage pulses at the terminals of the transmitting antenna, at a parasitic resonant frequency, said parasitic resonant frequency being different and distinct from the operating frequency,
b. determining an oscillating frequency of the transmitting circuit,
c. if the oscillating frequency is higher than the parasitic resonant frequency, then a foreign metal object is detected on the charging surface.

More specifically, if the oscillating frequency is lower than the parasitic resonant frequency, then a portable item of user equipment to be charged is detected on the charging surface.

Expediently, if the transmitting circuit is oscillating at a second resonant frequency when the frequency of the transmitting circuit is higher than the parasitic resonant frequency, then the simultaneous presence of a portable item of user equipment to be charged and of a foreign metal object is detected.

Advantageously, the predetermined number is equal to three.

More particularly, the parasitic resonant frequency is between 200 kHz and 1 MHz.

An aspect of the invention also relates to any charging device for a portable item of user equipment, comprising a microcontroller and a transmitting circuit, said transmitting circuit comprising at least one transmitting coil, that are suitable for charging the portable item of user equipment at an operating frequency, said device being noteworthy in that the transmitting circuit furthermore comprises means for generating a parasitic resonant frequency that is different and distinct from the operating frequency, and in that the device furthermore comprises:

a. means for measuring an oscillating frequency of the transmitting circuit and b. means for detecting a portable item of user equipment to be charged depending on the oscillating frequency thus measured.

More specifically, the detection means comprise means for comparing the oscillating frequency and the parasitic resonant frequency.

Expediently, the device furthermore comprises means for measuring a second resonant frequency of the transmitting circuit and means for detecting a compatible portable item of equipment to be charged depending on the second frequency thus provided.

Advantageously, the means for generating a parasitic resonant frequency are in the form of means for generating a predetermined number of voltage pulses at the terminals of the transmitting antenna at the parasitic resonant frequency.

The generating means may comprise a switch, a capacitor and a resistor that are connected to a voltage source.

More particularly, the parasitic resonant frequency is between 200 kHz and 1 MHz.

An aspect of the invention relates to any motor vehicle comprising a charging device according to any one of the previously listed features.

BRIEF DESCRIPTION OF THE DRAWINGS

Other features and advantages of aspects of the invention will become more apparent from reading the description that follows. This description is purely illustrative and must be read with reference to the attached drawings, in which.

DETAILED DESCRIPTION OF THE PREFERRED EMBODIMENTS

Figure 1:
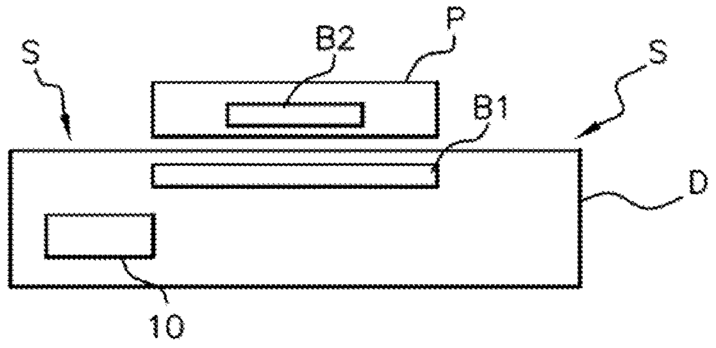
FIG. 1 schematically shows a charging device D of the prior art, above which there is a portable item of user equipment P to be charged, FIG. 2 schematically shows the means for generating voltage pulses at a parasitic resonant frequency, according to an aspect of the invention, FIG. 3 schematically shows the charging device D' according to an aspect of the invention.

FIG. 1 shows a charging device D of the prior art comprising a transmitting antenna B1 and a charging surface S, on which charging surface a portable item of user equipment P comprising a receiving antenna B2 is placed.

The charging device D, or inductive charging device, may be, for example but in an entirely non-limiting manner, intended to be installed in a motor vehicle.

As explained previously, when the transmitting antenna B1 and the receiving antenna B2 are located opposite each other, variations in the magnetic field that is generated by the transmitting antenna B1 cause an electric current to flow in the receiving antenna B2, thereby charging the portable item of user equipment P.

Figure 2:
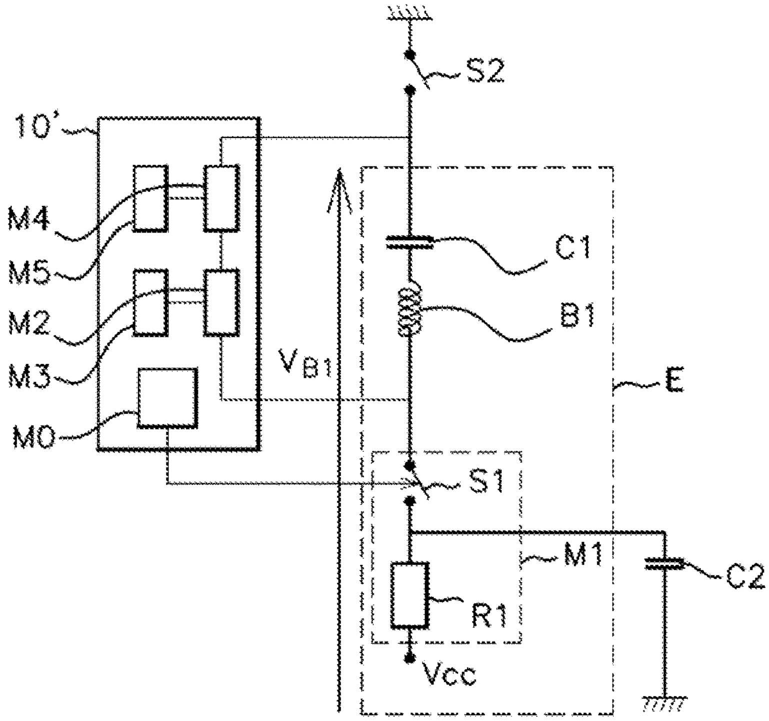
Figure 3:
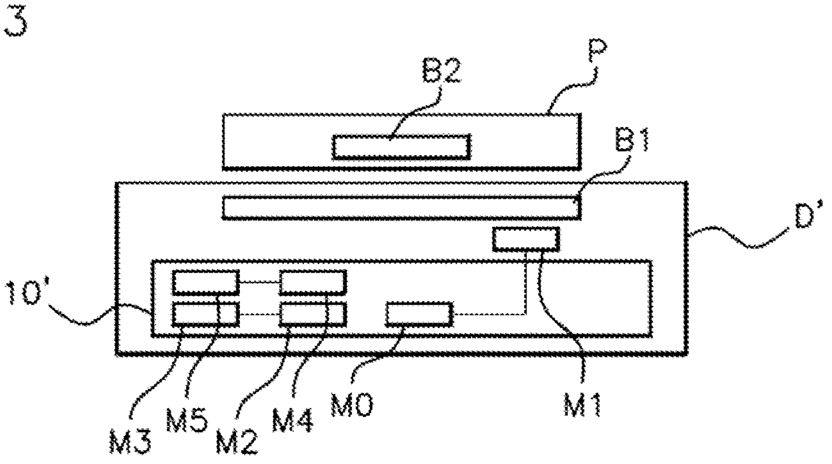

An aspect of the invention provides a charging device D' illustrated in FIGS. 2 and 3 allowing the drawbacks of the prior art to be overcome.

The device D' comprises a printed circuit 10' equipped with a microcontroller connected to the transmitting antenna B1 and also to an impedance-matching capacitor C1. The microcontroller 10 is suitable for managing the transmission and the reception of data via the transmitting antenna B1 at an operating frequency $F_{RF}$. Said operating frequency $F_{RF}$ is the frequency used to charge the portable item of user equipment P according to the Qi standard of the WPC® (Wireless Power Consortium), and is between 90 kHz and 205 kHz. To this end, the microcontroller comprises hardware and software means suitable for managing the transmission and the reception of data and also the control of the operation of the transmitting antenna B1. This is known from the prior art and will not be described in more detail here.

According to the invention, in a first embodiment of the invention, the charging device D' is equipped such that it also comprises:

a. means M1 for generating a parasitic resonant frequency $F_{RP}$ by way of the transmitting antenna B1, the parasitic resonant frequency being, for example, in a window between 200 kHz and 1 MHz, b. means M2 for measuring the oscillating frequency $F_E$ of the transmitting circuit E, and c. means M3 for detecting a foreign metal object depending on the oscillating frequency $F_E$ of the transmitting circuit E thus measured.

The generating means M1 are illustrated in FIG. 2 and are, for example, in the form of means for generating a predetermined number of pulses P1 at a voltage $V_1$ bound for the transmitting coil B1 at the parasitic resonant frequency $F_{RP}$, and comprise:

a. a switch S1, one side of which is connected to a branch of the transmitting antenna B1, b. a capacitor C2 connected to ground, on the other side of said switch S1, and connected in parallel to the transmitting antenna B1, allowing the value of the resonant frequency $F_{RP}$ to be adjusted to the desired value, and itself connected to c. a resistor R1 connected in parallel to the capacitor C2 and to a voltage source Vcc, and d. means M0 for controlling said switch S1, in order to open or to close said switch, said control means M0 being, for example, in software form.

The means M1 for generating the resonant frequency are in the form, for example, of a generator of voltage signals in the form of square waves.

Figure 4:
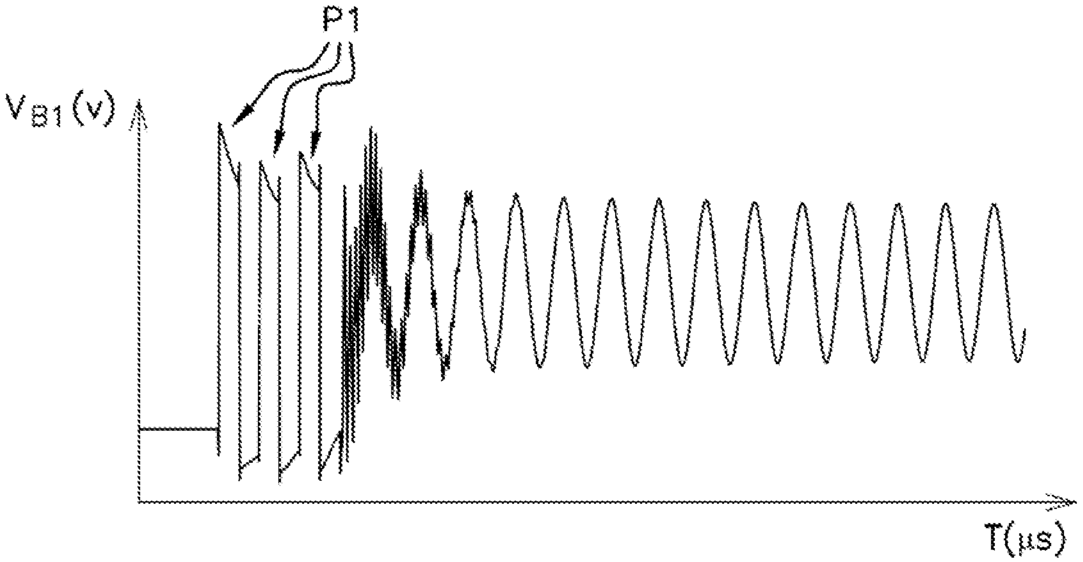
FIG. 4 is a graph showing the voltage pulses transmitted at the parasitic resonant frequency.
Figure 5:
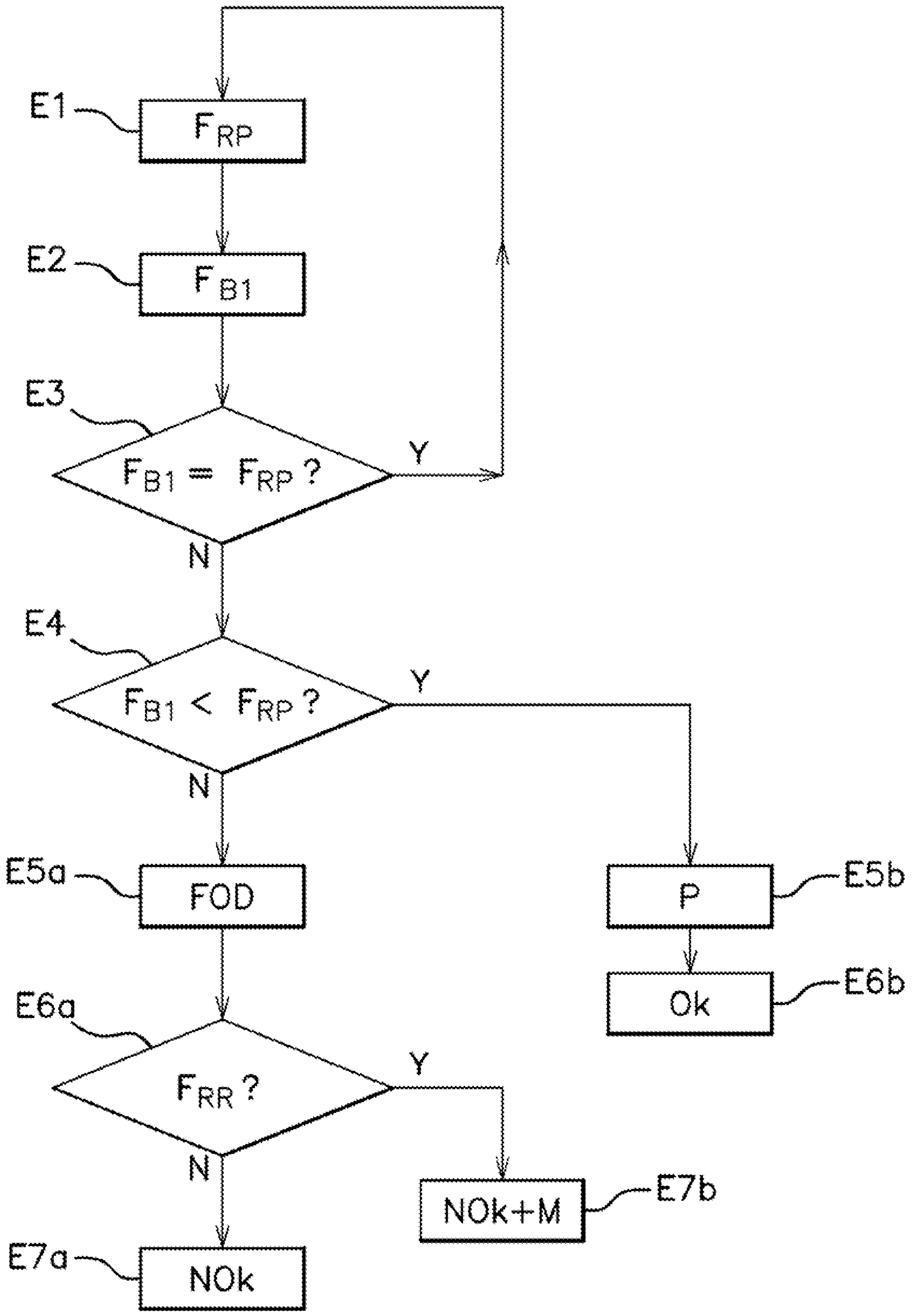
FIG. 5 is a flowchart showing the various steps of the detection method according to an aspect of the invention.

By controlling the opening and the closing of the switch S1, which is connected to the voltage source Vcc, voltage V1 pulses P1 are generated at the terminals of the transmitting antenna B1 at the parasitic resonant frequency $F_{RP}$. This is illustrated in FIG. 4. FIG. 5 shows three voltage pulses in the form of square waves.

The means M2 for measuring variation in the parasitic resonant frequency $F_{RP}$ are, for example, in software form.

"Transmitting circuit E" (cf. FIG. 2) is intended to mean the set of components comprising the transmitting antenna B1, the impedance-matching capacitor C1 and the means M1 for generating a parasitic resonant frequency $F_{RP}$.

Said measurement means M2 may comprise means for time analysis of the voltage $V_{B1}$ of the transmitting circuit E (between said transmitting circuit E and electrical ground) and comparing said voltage $V_{B1}$ with two threshold voltages, a minimum voltage V− and a maximum voltage V+, for a predetermined period Δt, in order to determine the oscillating frequency of said transmitting circuit E. These means for time analysis of the voltage $_{B1}$ of the transmitting circuit E that allow its oscillating frequency to be deduced therefrom are known to a person skilled in the art and will not be described in more detail here.

Alternatively, said measurement means M2 may comprise means for frequency analysis, such as a Fourier transform of the voltage $V_{B1}$ of the transmitting circuit E, in order to determine the oscillating frequency $F_E$ of said circuit E.

Time or frequency analysis of a voltage at the terminals of the transmitting coil B1 or of a voltage at the terminals of the resistor R1 may also be used. A person skilled in the art can determine an oscillating frequency of a transmitting circuit E by analyzing a voltage at the terminals of the components of said circuit.

The means M3 for detecting a foreign metal object also comprise means for comparing the oscillating frequency $F_E$ of the transmitting circuit E thus measured and the parasitic resonant frequency $F_{RP}$.

Said detection means M3 are suitable for determining the presence of a metal object and/or of a portable item of user equipment P. Said detection means M3 may be in software form.

The generating means M1, the measurement means M2 and the detection means M3 may be included in the printed circuit 10', either in the form of discrete components with a microcontroller or in the form of an ASIC (application-specific integrated circuit) and/or in software form.

In a second embodiment of the invention, the device D' furthermore comprises means M4 for measuring a second resonant frequency $F_{RR}$ and means M5 for detecting a compatible portable item of equipment to be charged depending on the second frequency $F_{RR}$ thus provided.

The means M4 for measuring a second resonant frequency $F_{RR}$ and also the detection means M5 may be in software form and comprise, respectively, means for time or frequency analysis of the voltage $V_{B1}$ of the transmitting circuit E, such as those described above for the measurement means M2, which make it possible to detect whether the transmitting circuit E is oscillating at a second resonant frequency $F_{RR}$ in order to determine the value of said frequency, and means for comparing said second frequency $F_{RR}$ with predetermined values.

The predetermined values of the second resonant frequency $F_{RR}$ correspond to resonant frequency values of receivers that are compatible with the charging standard, here the Qi standard, and are, for example, between 800 kHz and 1200 kHz.

An aspect of the invention is based on the observation by the applicant that the presence of a parasitic metal object and/or of a compatible portable item of user equipment P on the charging surface S of the device D' when the transmitting antenna B1 is generating electromagnetic waves at a parasitic frequency $F_{RP}$ causes the transmitting circuit E to oscillate at an oscillating frequency $F_E$ that is shifted from the parasitic resonant frequency $F_{RP}$, this downward or upward shift depending on the character of the object that is on the surface of the device D'.

Specifically, the applicant has observed that, in the presence of a foreign metal object (or FO), said oscillating frequency $F_E$ has a higher value than the initial parasitic resonant frequency $F_{RP}$.

Conversely, in the presence of a compatible portable item of user equipment P or of a TPR, that is to say a test power receiver, that is to say an electrical storage battery used during the phase of certifying mobile telephones for the Qi standard, said oscillating frequency $F_E$ has a lower value than the initial parasitic resonant frequency $F_{RP}$.

In addition, the applicant has observed that, in the presence of a portable item of user equipment P on the charging surface S, the transmission of an electromagnetic field at the parasitic resonant frequency $F_{RP}$ by the transmitting antenna B1 additionally results in the occurrence of a second resonant frequency, this resonant frequency $F_{RR}$ being that of the receiver P.

The detection method according to an aspect of the invention will now be described in light of the flowchart illustrated in FIG. 5.

Figure 6:
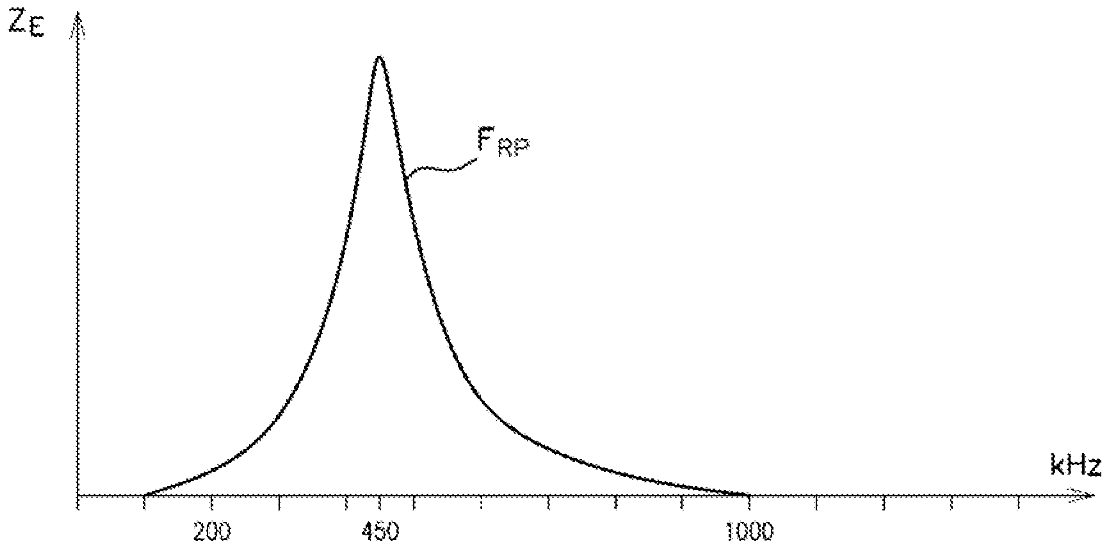
FIG. 6 is a graph showing the parasitic resonant frequency as a function of the impedance of the transmitting circuit.

In the initial step E1, a predetermined number N of voltage pulses P1 (cf. FIG. 4), for example N=3, that is to say three successive voltage pulses P1, are generated at the terminals of the transmitting antenna B1 and transmitted at a parasitic resonant frequency $F_{RP}$, that is to say in a window of values between 200 kHz and 1 MHz with a tolerance of +/− 10%, or between approximately 180 kHz and 1.1 MHz. These voltage pulses stimulate the transmitting circuit E at the parasitic resonant frequency $F_{RP}$. Said pulses have a period of between 0.91 μs and 5.56 μs. This is illustrated in FIG. 4 and in FIG. 6.

Said parasitic resonant frequency $F_{RP}$ is between 200 kHz and 1 MHz and is distinct from the operating frequency $F_{RF}$ according to the WPC Qi standard, which for its part is between 90 kHz and 205 kHz.

In the second step E2, once the three pulses P1 have been generated, the voltage $V_{B1}$ of the transmitting circuit E is measured and then the oscillating frequency $F_E$ of said circuit E is determined. Two embodiments are possible, either a time analysis or a frequency analysis.

In the third step E3, if the oscillating frequency $F_E$ of the transmitting circuit E is equal to the parasitic resonant frequency $F_{RP}$, then it is deduced therefrom that no object has been placed on the placement surface S, and the method returns to the first step E1.

In the fourth step E4, the two frequencies, $F_E$ and $F_{RP}$, are compared; if the oscillating frequency $F_E$ is lower than the parasitic resonant frequency $F_{RP}$, then it is deduced therefrom that either a portable item of user equipment P or a TPR has been placed on the charging surface (step E5*b*) and inductive charging is triggered (step E6*b*).

Figure 7:
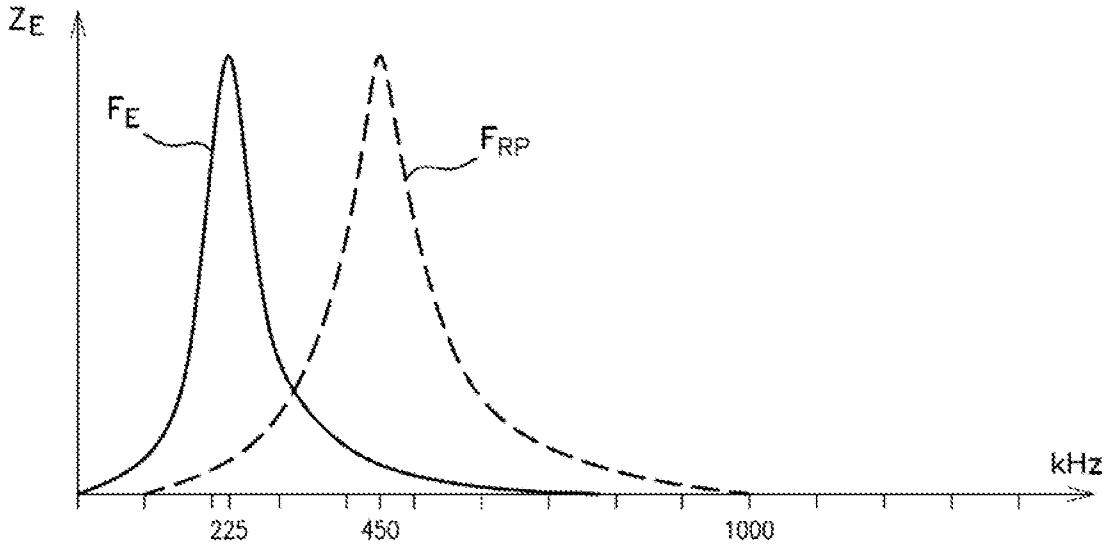
FIG. 7 is a graph showing the variation in the resonant frequency and the second resonant frequency as a function of the impedance of the transmitting circuit in the event of a portable item of user equipment being placed on the charging surface.

This is illustrated in FIG. 7, which is a graph showing the oscillating frequency $F_E$ as lower than the parasitic resonant frequency $F_{RP}$.

If the oscillating frequency $F_E$ is higher than the parasitic resonant frequency $F_{RP}$, then the presence of a foreign metal object FO on the charging surface S is deduced therefrom (step E5*a*), which object may be either alone on the charging surface or next to or under a portable item of user equipment P.

In order to distinguish between these two scenarios, step E6*a* involves checking whether the transmitting circuit E is also oscillating at a second resonant frequency $F_{RR}$. To this end, a time or frequency analysis of the voltage $V_{B1}$ is undertaken, which voltage is the voltage of the transmitting circuit E with reference to electrical ground.

Figure 8:
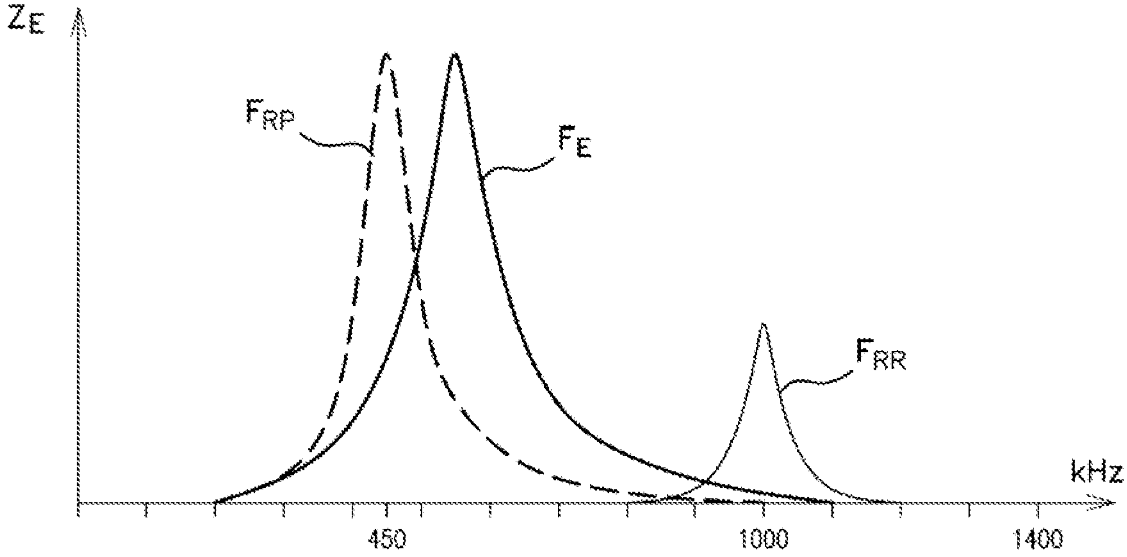
FIG. 8 is a graph showing the variation in the resonant frequency and the second resonant frequency as a function of the impedance of the transmitting circuit in the event of a foreign metal object and a portable item of user equipment being placed on the charging surface simultaneously.

If the transmitting circuit E, in addition to oscillating at a frequency $F_E$, is also oscillating at a second resonant frequency $F_{RR}$, which is different and distinct from the parasitic resonant frequency $F_{RP}$, and the value of which is in the predetermined window of values corresponding to the resonant frequencies of Qi receivers, then not only the presence of a foreign metal object FO but also the simultaneous presence either of a portable item of user equipment P or of a TPR on the charging surface S is deduced therefrom. In this case, inductive charging is not triggered, or is initiated at very low power and the user is warned of the presence of a foreign metal object on the charging surface S by a warning message M, which is either acoustic or visual (step E7*b*), so that the user removes the foreign metal object from the surface to allow inductive charging to be triggered. This is illustrated in FIG. 8, which shows the oscillating frequency $F_E$ as higher than the parasitic resonant frequency $F_{RP}$ and the presence of a second resonant frequency $F_{RR}$ as a function of the impedance $Z_E$ of the transmitting circuit. The second resonant frequency $F_{RR}$ corresponds to a resonant frequency of a receiver that is compatible with the Qi standard and has a value, in this example, equal to 1 MHz.

Figure 9:
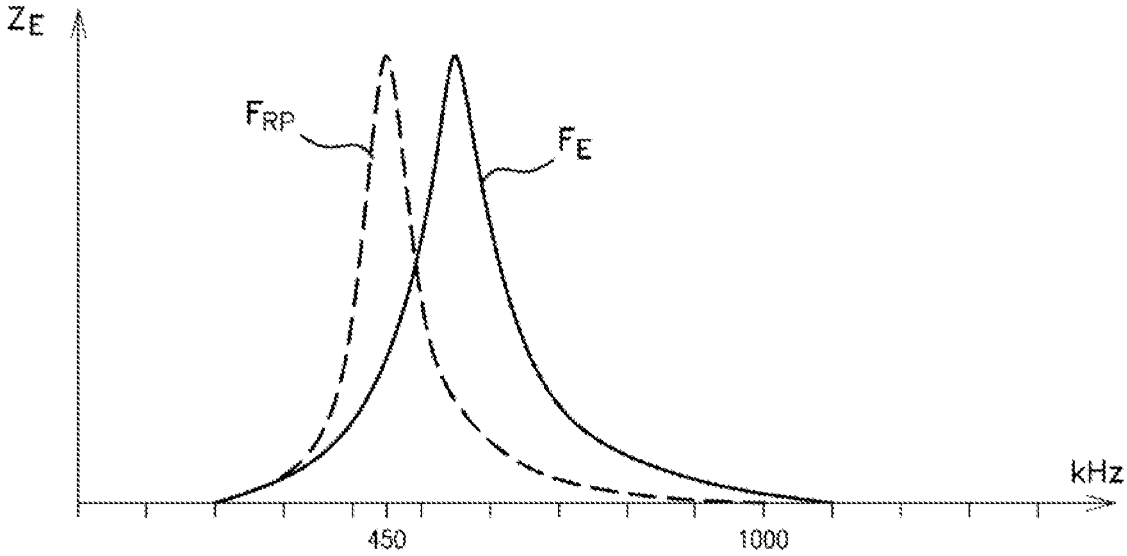
FIG. 9 is a graph showing the variation in the resonant frequency and the second resonant frequency as a function of the impedance of the transmitting circuit in the event of a foreign metal object being placed on the charging surface.

If the transmitting circuit E is not oscillating at a second resonant frequency $F_{RR}$, which is different and distinct from the parasitic resonant frequency $F_{RP}$, then it is deduced therefrom that there is only a foreign metal object FO on the charging surface S and inductive charging is not triggered (step E7*a*). This is illustrated in FIG. 9, which shows the oscillating frequency $F_E$ as higher than the parasitic resonant frequency $F_{RP}$ as a function of the impedance $Z_E$ of the circuit.

An aspect of the invention therefore ingeniously makes it possible to determine the presence of a foreign metal object on a charging surface of an inductive charging device in a simple and less energy-intensive manner than the method of the prior art; specifically, the voltage pulses consume a lot less electrical energy than the pings of the prior art.

An aspect of the invention is all the more advantageous because it makes it possible to also detect the presence of a foreign metal object at the same time as the presence of a compatible portable item of user equipment.

In addition, an aspect of the invention is reliable and simple to implement, as the means for embodying an aspect of the invention mainly consist of inexpensive hardware means or software means.

The invention claimed is:

1. A method for detecting a foreign metal object, by way of a charging device, comprising a microcontroller and a transmitting circuit, said transmitting circuit comprising at least one transmitting antenna, which are suitable for charging a portable item of user equipment placed on a charging surface at an operating frequency, the method comprising:

- a1) generating a predetermined number of voltage pulses at the terminals of the transmitting antenna at a parasitic resonant frequency, said parasitic resonant frequency being different and distinct from the operating frequency,
- a2) transmitting the generated predetermined number of voltage pulses at the terminals of the transmitting antenna, at the parasitic resonant frequency,
- a3) generating plural frequencies at the transmitting circuit, wherein a first oscillating frequency of the plural frequencies is determined by comparing a voltage at the terminals of the transmitting antenna with two threshold voltages for a predetermined period, and a second oscillating frequency of the plural frequencies is generated by a receiver in response to an electromagnetic field transmitted by the transmitting antenna;
- b) analyzing the plural frequencies of the transmitting circuit that are oscillating simultaneously such that:
  - b1) when the first oscillating frequency is higher than the parasitic resonant frequency, a foreign metal object is detected on the charging surface,
  - b2) when the first oscillating frequency is lower than the parasitic resonant frequency, the portable item of user equipment to be charged is detected on the charging surface, and
  - b3) when the second oscillating frequency oscillates at a second resonant frequency and when the first oscillating frequency is higher than the parasitic resonant frequency, then the simultaneous presence of the portable item of user equipment to be charged and of a foreign metal object are detected on the charging surface, wherein the parasitic resonant frequency is between 200 kHz and 1 MHz, the second resonant frequency is different and distinct from the parasitic resonant frequency, and a value of the second resonant frequency is between 800 KHz and 1200 kHz.

2. The detection method as claimed in claim 1, wherein, the second oscillating frequency is higher than the first oscillating frequency of the transmitting circuit.

3. The detection method as claimed in claim 1, wherein the predetermined number is equal to three.

4. The detection method as claimed in claim 1, wherein the electromagnetic field generated by the transmitting antenna is at the parasitic resonant frequency.

5. A charging device for a portable item of user equipment, the charging device comprising:

- a microcontroller;
- a charging surface;
- a transmitting circuit comprising:
  - at least one transmitting coil configured for charging the portable item of user equipment at an operating frequency, and
  - means for generating a parasitic resonant frequency that is different and distinct from the operating frequency,
  - means for generating plural oscillating frequencies at the transmitting circuit, wherein a first oscillating frequency of the plural oscillating frequencies is generated by comparing a voltage at the terminals of the transmitting antenna with two threshold voltages for a predetermined period, and a second oscillating frequency of the plural oscillating frequencies is generated by a receiver in response to an electromagnetic field transmitted by the transmitting antenna;

means for analyzing the plural oscillating frequencies of the transmitting circuit that are oscillating simultaneously; and means for detecting a foreign metal object and/or a portable item of user equipment to be charged depending on the oscillating frequency thus measured as follows:

i) when the first oscillating frequency is higher than the parasitic resonant frequency, then the foreign metal object is detected on the charging surface, ii) when the first oscillating frequency is lower than the parasitic resonant frequency, then the portable item of user equipment to be charged is detected on the charging surface, and iii) when the second oscillating frequency is oscillating at a second resonant frequency and when the first oscillating frequency of the transmitting circuit is higher than the parasitic resonant frequency, the portable item of user equipment to be charged and the foreign metal object are detected on the charging surface, wherein the parasitic resonant frequency is between 200 kHz and 1 MHz, wherein the second resonant frequency is different and distinct from the parasitic resonant frequency, and wherein a value of the second resonant frequency is between 800 kHz and 1200 KHz.

6. The charging device as claimed in claim 5, wherein the detection means comprise means for comparing the oscillating frequency and the parasitic resonant frequency.

7. The charging device as claimed in claim 5, further comprising means for measuring the second oscillating frequency and means for detecting a compatible portable item of equipment to be charged depending on the second oscillating frequency thus provided.

8. The charging device as claimed in claim 5, wherein the means for generating the parasitic resonant frequency are in the form of means for generating a predetermined number of voltage pulses at terminals of a transmitting antenna at the parasitic resonant frequency.

9. The charging device as claimed in claim 5, wherein the generating means comprise a switch connected at a first side to a branch of a transmitting antenna, a capacitor connected to ground and a second side of the switch, and a resistor connected to a voltage source and to the second side of the switch.

10. A motor vehicle, comprising a charging device as claimed in claim 5.

11. The charging device as claimed in claim 5, wherein the electromagnetic field generated by the transmitting antenna is at the parasitic resonant frequency.

* * * * *